Oct. 31, 1961 M. ROGOFF 3,007,161
RADIO NAVIGATIONAL AID RECEIVER
Filed Dec. 10, 1956
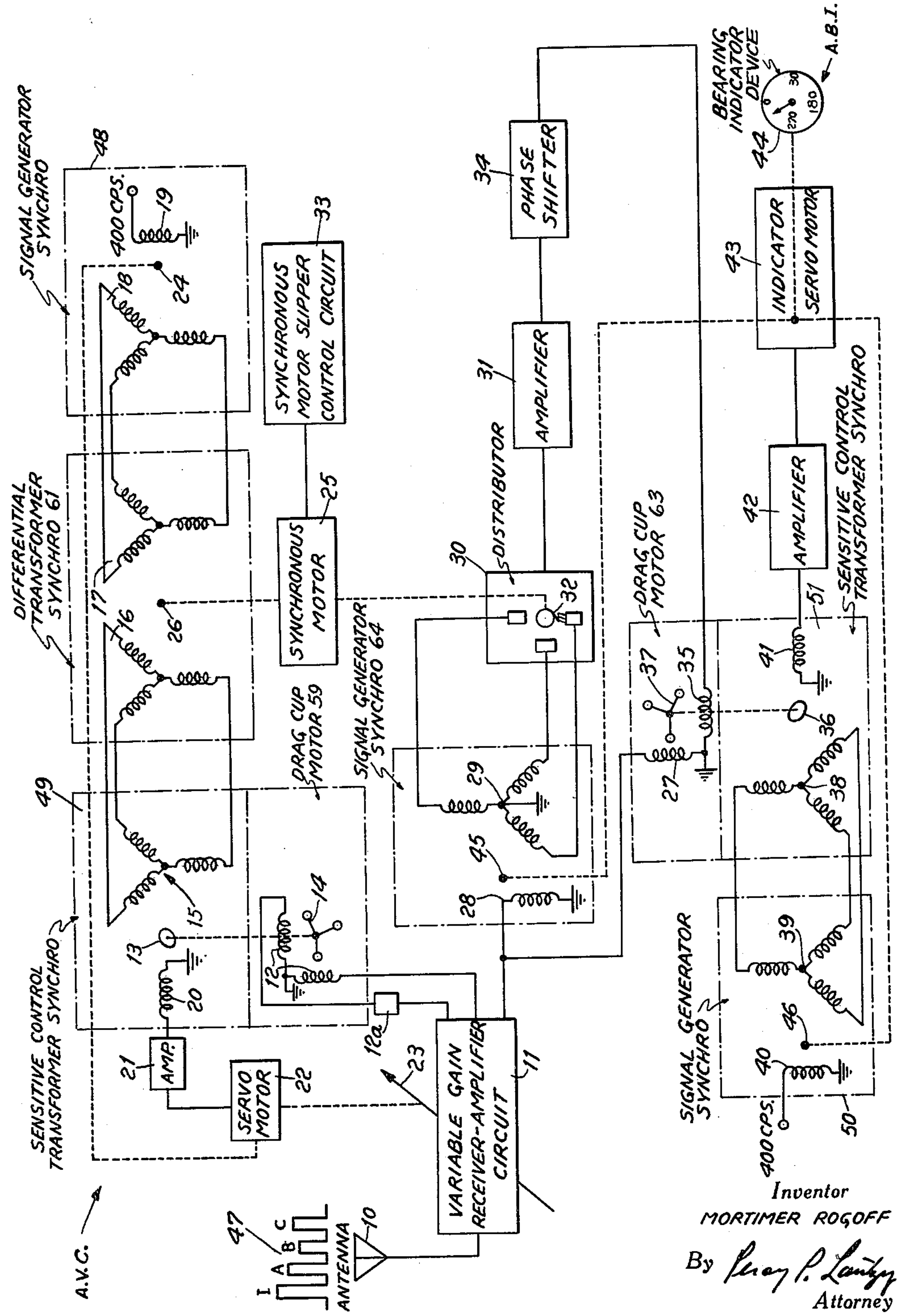
Inventor
MORTIMER ROGOFF
By Leroy P. Landry
Attorney United States Patent Office 3,007,161

Patented Oct. 31, 1961

3,007,161

RADIO NAVIGATIONAL AID RECEIVER

Mortimer Rogoff, Nutley, N.J., assignor to International Telephone and Telegraph Corporation, Nutley, N.J., a corporation of Maryland Filed Dec. 10, 1956, Ser. No. 627,156
8 Claims. (Cl. 343—106)

This invention relates generally to radio navigational aid systems and in particular to a radio navigational aid system, such as Navaglobe, whose capacity for determining the bearing angle of a receiver station with respect to a transmitter station depends on the amplitude relationship of the bearing information signals received.

The Navaglobe system provides a transmitting station where there are three transmitting antennas located at the corners of an equilibrium triangle. These antennas are excited in pairs, successively, so that the result is the radiation of radio frequency energy in directional patterns resembling a figure-of-eight; each pattern being shifted 120° in orientation from the adjacent pattern. Consequently, at any direction from the transmitter, a cyclic succession of three bearing information signals can be received at a receiver station with the relative amplitudes of these signals depending on the bearing angle of the receiving station in respect to the transmitting station. A fourth signal is transmitted in each cycle to serve as a uniform synchronizing signal which is used to identify the start of each cycle of three signals and its strength is independent of direction. At the receiving station the three bearing information signals are automatically identified and isolated through use of the synchronous signal, and are applied in a proper manner to the input side of a bearing translator means which automatically rotates a shaft to an angular position which depends on the relative strengths of the three signals. A pointer attached to this shaft indicates directly the geographic bearing angle of the receiver station from the transmitter station. This navigational service is completely omnidirectional, direct reading and is essentially nonambiguous.

In the publication "Electric Communication," vol. 31 No. 3, dated September 1954, and published by International Telephone and Telegraph Corporation, there is a complete disclosure of the Navaglobe operation.

In the past the received signals were applied to different windings of a three coil vector ratiometer whose needle assumed a position depending upon the vector sum of the magnetic fields developed in its three coils. Although this ratiometer performed satisfactorily it did possess some disadvantages. For instance, considerable direct current (D.C.) power was required to produce the magnetic field necessary to control the ratiometer needle and the needle was susceptible to external D.C. magnetic influences. In addition each meter required an individual calibration after installation. The known detector system utilized a linear detection method. It incurred errors in the indication due to noise. This D.C. error, usually referred to as "cumulative noise error" produced a "set" in the indicator that varied with the noise level and bearing angle. In a U.S. patent application of P. R. Adams, B. Alexander and R. I. Colin, Serial No. 382,934, now abandoned, filed September 29, 1953, entitled "Aerial Navigation Indicator" and assigned to the same assignee as this application, an improvement of the Navaglobe aerial navigation beacon system has been disclosed in which the indicator of the ratiometer type was replaced by the mathematical equivalent but operationally superior indicator of the resolver type. This system includes a square law detector circuit to eliminate the noise error described above. The bearing information signals being obtained and being detected at the receiver station are passed to the rotor coil of the resolver. Under the control of a distributor device which operates in a commutating fashion there are individually and successively induced voltages in pre-designated stator windings of the resolver. The induced voltages have strength characteristics which depend on the amplitude of the original signal and also on the coupling position of the rotor with respect to the stator. This voltage vector relation controls a servo loop to effect an angular positioning of a shaft representing a bearing angle between the receiver station and the transmitting station.

At the Navaglobe receiver, if the bearing information signals received are of great amplitude because, for instance, of the proximity of the receiver station to the transmitter station, the inherent time constant of the system is disturbed since a resultant error signal is consequently large. It follows that if information bearing signals are characterized by small amplitudes, for instance, for lack of said proximity this condition also disturbs the inherent time constant of the system. It becomes clear that an automatic gain control system is a necessary part of such a receiver in order to effect a proper time constant for the system utility. Reference is made to the provision of an automatic gain control system in both the aforementioned publications, "Electric Communications," and the U.S. patent application Serial No. 382,934 "Aerial Navigation Indicator," now abandoned.

The automatic gain control system used in the past has been of the conventional type which operated with part of the amplifier signal fed back through rectification means in order to bias the grid of the amplifier. When using this conventional automatic gain control device in the system at hand, there is a separate integration component in operation, and as pointed out in the disclosure of the above-mentioned application "Aerial Navigation Indicator" the automatic gain control should be extremely slow acting in order not to disturb the amplitude ratio of the three Navaglobe signals within one cycle. The indicating portion of the system also uses a separate integration means and requires a relatively long time constant for the integration of the signals from the resolver output. Such an integration of the output is necessary to determine a null point or detect an error for controlling a servo loop. While the Navaglobe receiver in the improved state as described in the application disclosure of U.S. patent application "Aerial Navigation Indicator," Serial No. 382,934, now abandoned, operates well and has been used to a great extent, it is apparent that this receiver system does have certain disadvantages in that there is a risk of bearing signal impairment because of the AGC time constant as well as there being a necessity for separate integration components.

It is, therefore, an object of this invention to provide an improved radio navigational aid receiver.

It is a further object of this invention to provide a radio navigation aid bearing indicating system wherein there is no separate integration component necessary and yet wherein the square law detector advancement of the art as applied the signal translation operation is preserved.

It is a further object of this invention to provide a radio navigational aid receiver wherein there is provided an automatic gain control means and wherein there is no risk of bearing signal amplitude relationship impairment.

The invention accordingly features two sensitive control transformer synchros, each of which is driven by an associated drag cup motor with one of each synchros being used respectively with an automatic gain control means and an automatic bearing angle indicating means. The sensitive control transformer synchro in the preferred embodiment is of the type described in the disclosure of U.S. Patent 2,689,951, issued to M. Argentieri, wherein there is a three coiled stator, a rotor winding and a rotor body which has a single loop disposed coaxially with the rotor shaft. The drag cup motor in the preferred embodiment is of well-known design. The two units are combined to attain a device with high sensitivity, excellent inertia properties and square law detection means; all of such characteristics being necessary to accomplish the objects of the invention above. The square law detection is accomplished by the drag cup motor. It is known that the torque in a two-phase drag cup motor can be represented by $T \cong I_1 I_2 \sin \phi$ where $I_1$ and $I_2$ are current signals having the same frequency and $\phi$ is the phase angle between the signals. Where $\phi = 90°$ as in the present case, $\sin \phi = 1$ and the torque is proportional to the product of $I_1 \times I_2$. Since $I_1 = I_2$, then the torque is obviously proportional to the square of $I_1$. In the automatic gain control arrangement, the speed of the drag cup motor is affected by applying the amplified energy of the bearing information signal input in quadrature to the windings of the motor. By virtue of the design of the system, if the amplification level is correct, the drag cup motor rotates at a predetermined average speed. This speed of the drag cup motor is compared with a finely controlled synchronous motor. If non-synchronization is present between the two motors, an undesirable amplification level is sensed and thereafter corrected through a servo loop of which the sensitive control transformer synchro (which is coupled to the drag cup motor) is the heart. In the automatic bearing indication arrangement, the bearing information signals received are individually and sequentially applied to the quadrature windings of a second drag cup motor. The three bearing information signals cause the shaft of the motor to rotate either clockwise or counter clockwise in three steps. The net movement of the drag cup motor shaft is sampled by the system. A zero net movement means that the indicating device is indicating the correct bearing angle between the receiver station and the transmitter station. A net movement other than zero results in an error signal which in turn causes a servo loop to reposition the indicating device and the rotors of two signal generator synchros. When the rotor of the signal generator synchro, through which the bearing information signals are passed to the motor windings, is positioned in the only position which represents the correct bearing angle, then the signals passed to the quadrature windings will cause the shaft to have a zero net movement.

The above mentioned and other features and objects of this invention will become more apparent by reference to the following description taken in conjunction with the drawing in which the sole figure is a combination block diagram and schematic diagram showing the receiver system.

While the invention will be described in connection with a "Navaglobe" system it will be understood that it is capable of use with any other pulse signaling system wherein the bearing angle of the receiver station in relation to the transmitting station is to be determined by the amplitude relationship of the bearing information signals received at the receiver station.

In the drawing, a receiving antenna 10 is coupled to a variable gain receiver-amplifier circuit 11. To the receiver-amplifier circuit 11 there are coupled two parallel control means, one being an automatic voltage control or automatic gain control means, A.V.C., and the other being an automatic bearing indicator means, A.B.I. Examining first the automatic gain control means A.V.C. there is connected to the variable gain receiver-amplifier circuit 11 the quadrature windings 12 of a first drag cup motor 59. One of said quadrature windings is coupled through the 90° phase shifter 12a. Mechanically coupled to the drag cup motor shaft 14 is the rotor 13 of a first sensitive control transformer synchro 49. The stator windings 15 of the sensitive control transformer synchro 49 are connected to the rotor windings 16 of a differential transformer synchro 61 and the stator windings 17 of the differential transformer synchro 61 are in turn coupled to the stator windings 18 of a first signal generator synchro 48. The rotor winding 19 of the first signal generator synchro 48 is connected to the line supply shown as 400 c.p.s. The rotor winding 20 of the first sensitive control transformer synchro 49 is connected to a first amplifier 21 and serially through said amplifier to a servo motor 22. The servo motor 22 is mechanically coupled to the movable arm 23 of variable gain receiver-amplifier circuit 11 and also mechanically coupled to the rotor 24 of the first signal generator synchro 48. There is a synchronous motor 25 mechanically coupled to the rotor 26 of the differential transformer synchro 61. Examining the mechanical and circuitry coupling of the aforementioned automatic bearing indicator means, we find one winding 27 of the quadrature windings of a second drag cup motor 63 is connected to the variable gain receiver-amplifier circuit 11, and the rotor winding 28 of a second signal generator synchro 64 is likewise connected to the variable gain receiver amplifier circuit 11. The stator windings 29 of the second signal generator synchro 64 are connected to a distributor 30 and through said distributor serially to second amplifier 31. The rotor shaft 32 is mechanically coupled to the synchronous motor 25 while the slipper circuitry means at 33 is coupled also to the synchronous motor 25. A phase shifter 34 is connected to the second amplifier at 31 and to the other quadrature winding 35 of the aforementioned second drag cup motor 63. The rotor 36 of a second sensitive control transformer synchro 51 is mechanically coupled to the drive shaft of the aforementioned second drag cup motor 63. The stator windings 38 of the second sensitive control transformer synchro 51 are connected to the stator windings 39 of a third signal generator synchro 50. The rotor winding 40 of the third signal generator synchro 50 is connected to a line supply shown as 400 c.p.s. The rotor winding 41 of the second sensitive control transformer synchro 51 is connected to a third amplifier 42 and through said amplifier to an indicator servo motor 43. The indicator servo motor 43 is mechanically coupled to a bearing indicator device 44, to the rotor 45 of the second signal generator synchro 64 and to the rotor 46 of the third signal generator synchro 50. The operation of the receiver system will become more comprehensive with the following description.

In the figure, signals shown at 47 as IABC represent respectively an identification or synchronizing signal I and three bearing information signals A, B, and C. These signals are received at the antenna 10 from the transmitter. Since the direction of the receiver station from the transmitter station is dependent on the amplitude relationship of these signals A, B and C, it is clear that it is mandatory that a fixed voltage level be maintained by the receiving system for sensing these signals in order that the proper amplitude relationship might be detected and a proper system time constant be maintained; therefore, one part of the receiver system is an automatic voltage control device. It is also clear from the above discussion that if there be any voltage adjustment of the system it is preferably accomplished during some time other than when the A, B, and C signals are received, lest an improper amplitude relationship would result and in turn an improper bearing indication read. This impropriety is avoided by adjusting the gain of the system during "I" time as shown at 47. In this connection it may be pointed out as set forth in the above referred to publication "Electrical Communication," volume 31, No. 3, dated September, 1954 on page 157, second column, that the synchronizing signal ("I") is radiated on a slightly different frequency than that used for the A, B, and C signals. Thus, it is obvious that it can be separated and used to control the adjustment of the variable gain receiver-amplifier circuit 11 so that this adjustment only occurs during the time of the "I" pulse.

One way of accomplishing the foregoing is set forth in the publication "Television Principles" by Robert B. Dome published by McGraw-Hill Book Company, Inc., New York, 1951, in chapter 10 thereof pages 261 to 267, inclusive. Other ways of accomplishing this will readily occur to those versed in the art and since the particular way employed is not part of the present invention, no further elaboration on these possibilities is made. The complete system is synchronized to "I" time by means of "slipping" the synchronous motor 25 through the control circuitry 33, which circuitry can be any type of phase shifter, such as, for example, a resolver. Let us consider first the operation of the automatic voltage control portion of the system. It is known that the cumulative power received at a receiving station which can be attributed to the bearing signals A, B, and C will be very nearly the same for any point on a circle where the transmitting station is the center of the circle. Using this feature, the automatic gain control system functions by having the received signal energy applied to the quadrature windings 12 of the first mentioned drag cup motor 59. If the energy remains constant, the average speed of the first drag cup motor shaft 14 will remain constant. If the receiving station moves closer or farther away from the transmitting station, the energy input to the first drag cup motor 59 would vary, and hence the average speed of the drag cup motor 59 would vary. If the amplified signal energy applied to the quadrature windings 12 is at a predetermined value, then the average rotational speed of this first drag cup motor shaft 14 will be exactly the same rotational speed as the synchronous motor 25 and by comparing the speeds of these two motors, the system is able to detect whether or not the gain level at 11 is the proper value. The means for making this comparison is as follows: The first signal generator synchro 48 sets up a voltage vector relationship at its stator windings 18 which is passed to the stator windings 17 of a differential transformer synchro 61. The rotor windings 16 of the differential transformer synchro 61, according to synchro principles, changes the voltage vector relationship of the input at 17 depending on the position for coupling of these rotor windings 16 with the stator windings 17. Since the rotor 26 of the differential transformer synchro 61 is driven by the synchronous motor 25, the voltage vector relationship of the output appearing at the rotor windings 16 is always the same, if sensed or read at any synchronized repeated time. The output at 16 characterized by this voltage vector relationship is passed to the stator windings 15 of the first sensitive control transformer synchro 49 and depending on the position of rotor 13 there may or may not be a voltage reading across the rotor winding 20. As discussed above the sensitive control transformer 49 is of the type described in U.S. patent disclosure 2,689,951. Assuming at a particular time $t$, there was no reading across the rotor winding 20 and further assuming that during the period $\Delta t$ the speed of the rotor 13 was the same as the speed of the rotor 26, then at the end of $\Delta t$ there would be no voltage differential sensed at 20. In this discussion $t$ should be considered "I" time and $\Delta t$ from "I" time to "I" time. If, however, during $\Delta t$ the speed of the rotor 13 differed from the speed of the rotor 26, then there would be a voltage differential appearing across the winding 20. This voltage differential signal would in turn be passed to amplifier 21 for a normal amplification operation, and be further passed to servo motor 22 to drive said motor. Servo motor 22, being mechanically coupled to the variable arm 23, would move this arm in the proper direction so that the signals A, B, and C when amplified at the variable gain receiver-amplifier circuit 11 would be amplified to the proper level such that rotational speed of motor shaft 14 would approach the rotational speed of synchronous motor shaft 26. At the same time motor 22 being mechanically coupled to the first signal generator synchro 48 would position the rotor 24 and hence the rotor winding 19 such that during the next pulse period "I," which as mentioned before is the period for adjustment, the voltage vector comparison would be from a reference point which approximated the reference position of the rotor 13 during the previous "I" period. If the rotor winding 19 were not adjusted to the new position, it follows that although the speeds of the motors 25 and 59 might be the same, the coupling between rotor winding 19 and stator winding 18 need not be the same as the coupling between rotor 13 and stator winding 15, and this would result in an improper error signal, since a proper error signal should only indicate a difference in speeds. This operation is repeated during the "I" time so that the gain of the system is continually adjusted to its proper level. Now let us consider the operation of the automatic bearing indicator portion of the system. A bearing signal "A" being passed from the variable gain receiving-amplifier circuit 11 goes by parallel circuitry means to the one quadrature winding 27 of the second drag cup motor 63 and to the rotor winding 28 of the second signal generator synchro 64. The signal "A" is sensed in each of the windings of the stator 29 of the second generator synchro, but only one of the stator windings at 29 is permitted to pass the signal because only one winding at a time is connected through distributor 30 to the second amplifier 31. The distributor 30 acting in a commutator fashion selects the proper winding to go with the proper signal and hence, at the second amplifier 31 there are three separate signals appearing sequentially with each having a characteristic amplitude and polarity. At I time the distributor output is disconnected from the windings 29 and thus no I signal is applied via amplifier 31, phase shifter 34 to winding 35 of the second drag cup motor. In the absence of a signal on winding 35, the presence of a signal on winding 27 produces no rotation of rotor 37. These signals are passed through phase shifter 34 to the other quadrature winding 35 of the second drag cup motor 63. As each signal "A," "B," and "C" passes through the circuitry there results at the second drag cup motor 63 a step like movement of the motor shaft 37 which might be in a forward direction or in a reverse direction depending on the amplitude and polarity of the signals received at the quadrature windings 27 and 35. After having been stepped three times, the shaft, acting in analog computer fashion, is now in a position which represents an amplitude relationship of the signals "A," "B," and "C." The rotor winding 28 has only one correct position for each bearing angle considered by the system. A zero net movement of the shaft 37 resulting from the above stepping operating means that the rotor 28 is in its only correct position for the bearing angle between the receiver station and the transmitter station. A net movement other than zero means that the rotor winding 28 should be repositioned and consequently, the indication of the indicator device 44 must be repositioned. It becomes necessary to translate the second drag cup motor 63 shaft position to an indicating device; therefore, this shaft is coupled to the rotor 36 of the second sensitive control transformer synchro 51 which serves as a basic component to accomplish this translation. The third signal generator synchro 50 establishes a voltage vector related output at 39 which depends on the physical disposition of its rotor winding 40 in relation to its stator windings 39. This voltage vector related output is passed to the stator windings 38 of the second sensitive control transformer synchro 51. Depending on the position of rotor 36, there may or may not be a voltage differential appearing across the rotor winding 41. Assuming at a time $t$ there is not a voltage differential appearing across the rotor winding 41, and that after a time period $\Delta t$ the rotor position at 36 has not changed and the rotor winding position at 40 has not changed, then there still will be no voltage differential appearing at 41; if, however, rotor 36 does change its position at the end of $\Delta t$ there would appear a voltage differential across rotor winding 41 and a resultant error signal would be passed through amplifier 42 for a normal amplification operation and on to the indicator servo motor 43 for driving said motor. The servo motor 43 would simultaneously drive the bearing indicator device to a new reading and the rotors 45 and 46 of the second and third signal generator synchros 64 and 50, respectively, in order that a new reference for the next series of "A," "B," and "C" signal will be established from the reference point of the new indicator reading. This operation will continue with the indicator device continually seeking the proper bearing indication as the receiving station moves and continually correcting its reference point, which is representative of the indication at the indicating device, to assure the proper bearing indication.

While I have described above the principles of my invention in connection with specific apparatus, it is to be clearly understood that this description is made only by way of example and not as a limitation to the scope of my invention as set forth in the objects thereof and in the accompanying claims.

I claim:

1. An automatic gain control system comprising a variable gain amplifier, a first motor which rotates at a predetermined speed, a second motor coupled to the output of said amplifier, said amplifier output controlling the rotational speed thereof, comparison means coupled to said first motor and said second motor for comparing the respective rotational speeds of said motors and for transmitting an error signal representative of a speed difference therebetween, and means coupled to said comparison means and said variable gain amplifier for receiving said error signal and adjusting said variable amplifier in accordance therewith.

2. An automatic gain control system comprising a variable gain amplifier, a first motor which rotates at a predetermined speed, a two-phase second motor coupled to the output of said amplifier, said amplifier output controlling the rotational speed thereof, comparison means coupled to said two-phase motor and said first motor for comparing the respective rotational speeds of said motors and for transmitting an error signal representative of a speed difference therebetween, and means coupled to said comparison means and said variable gain amplifier for receiving said error signal and adjusting said variable amplifier in accordance therewith.

3. An automatic gain control system according to claim 2, wherein said two-phase motor is a drag cup motor.

4. An automatic bearing indicator device for use with a radio navigational aid receiver which receives from a transmitter bearing information signals whose relative amplitudes are dependent on the bearing angle of said receiver station from said transmitting station comprising a receiver antenna, a receiver-amplifier circuit coupled to said antenna, a motor means whose shaft displacement is proportional to the square of an input signal applied thereto, a signal generator synchro having a rotor, a distributor means, circuitry means coupling in series said synchro generator, said distributor means and said motor means to cause a discrete movement of the shaft of said motor means in accordance with the reception of each of said bearing information signals, an indicating device, servo means coupled between said indicating device and said signal generator synchro to cause said rotor to be positioned according to said indicating device, and comparison means coupled to said motor means shaft and said rotor positioning means for comparing the positions of said shaft with said rotor positioning means and transmitting an error signal in accordance with the difference thereof to cause said servo means to adjust said indicating means therewith.

5. An automatic bearing indicator device for use with a radio navigational aid receiver which receives from a transmitter bearing information signals whose relative amplitudes are dependent on the bearing angle of said receiver station from said transmitting station comprising a receiving antenna, a receiver-amplifier circuit coupled to said antenna, a drag cup motor with quadrature windings coupled to said receiver-amplifier circuit, a signal generator synchro having a rotor, a distributor means, a phase shifting means, circuitry means coupling in series, between said quadrature windings, said synchro generator, said distributor means and said phase shifting means to cause a discrete movement of the shaft of said drag cup motor in accordance with the reception of each of said bearing information signals, an indicating device, means coupled between said indicating device and said signal generator synchro to cause said rotor to be positioned according to said indicating device, and a comparison means coupled to said drag cup motor shaft and said rotor positioning means for comparing the positions of said drag cup motor shaft with said rotor positioning means and transmitting an error signal in accordance with a difference thereof to cause said servo means to adjust said indicating means therewith.

6. A radio navigation aid receiver system for receiving from a transmitter, bearing information signals whose relative amplitudes are dependent on the bearing angle of said receiver station from said transmitter station comprising a receiving antenna, a variable gain receiver-amplifier circuit coupled to said antenna for receiving said bearing information signals, a first servo loop coupled to said variable gain receiver-amplifier circuit to maintain a fixed voltage level reference for said receiver system, a second servo loop including a sensitive control transformer synchro, a bearing indicator device, a square law detector means including a drag cup motor coupled to said receiver-amplifier circuit to control therewith said drag cup motor shaft position, said sensitive control transformer synchro being coupled to said drag cup motor for driving therewith, and said second servo loop being coupled to said square law detector means and said bearing indicator device whereby said indicator device is positioned in accordance with the voltage amplitude relation of said received bearing information signals.

7. A radio navigation aid receiver system as recited in claim 6, said first servo loop including a second drag cup motor, a second sensitive control transformer synchro coupled to said second drag cup motor, a differential transformer synchro, a synchronous motor for driving the rotor of said differential transformer synchro, a signal generator synchro coupled to the input of said differential transformer synchro, a servo motor for positioning respectively the rotor of said signal generator synchro and the variable control of said variable receiver-amplifier circuit, a first amplifier, and circuitry means to couple said second sensitive control transformer synchro input and output respectively to said differential transformer synchro output and through said amplifier to said servo motor input to compare the rotational speed of the rotor of said drag cup motor with the rotational speed of said synchronous motor such that non-synchronization gives rise to a signal which in turn effects a gain adjustment of said receiver-amplifier circuit by means of said servo motor.

8. A radio navigation aid receiver system for receiving from a transmitter bearing information signals whose relative amplitudes are dependent on the direction of said receiver station from said transmitter station comprising a receiver antenna, a variable receiver-amplifier circuit coupled to said antenna for receiving said bearing information signals, a first sensitive control transformer synchro coupled to a first drag motor for driving therewith, a differential transformer synchro, a synchronous motor for driving the rotor of said differential transformer synchro, a first signal generator synchro coupled to the input of said differential transformer synchro, a first servo motor for positioning respectively the rotor of said first signal generator synchro and the variable arm of said variable receiver amplifier circuit, a first amplifier, circuitry means to couple said first sensitive control transformer synchro input and output respectively to said differential transformer synchro output and through said first amplifier to said first servo motor input whereby the rotational speed of the rotor of said first drag cup motor is compared with the rotational speed of said synchronous motor such that non-synchronization gives rise to a signal which in turn effects a gain adjustment of said receiver amplifier circuit by means of said first servo motor and thereby maintains a fixed voltage reference for said receiver system, an indicator device, indicator servo motor to drive said indicator device, a second sensitive control transformer synchro coupled to a second drag cup motor, said second drag cup motor having two windings disposed in quadrature, a second signal generator synchro whose rotor winding is coupled to one of said quadrature windings and whose rotor is coupled to said indicator servo motor, a distributor device coupled to the output of said second signal generator synchro, a second amplifier, a phase shifter and circuitry means to serially couple the output of said distributor device through said amplifier and said phase shifter to the other of said quadrature windings whereby bearing information signals received at said second signal generator synchro are sequentially and individually passed to said quadrature windings such that each signal results in a vectorial movement of said second drag cup motor shaft which is proportional to the square of said bearing information signal input, a third signal generator synchro whose output is coupled to the input of said second sensitive control transformer synchro, a third amplifier, and said indicator servo motor coupled respectively to the rotor of said third signal generator synchro and through said third amplifier to the output of said second sensitive control transformer synchro whereby said indicator device is positioned in accordance with the voltage amplitude relation of said received bearing information signals.

No references cited.